United States Patent Office 3,532,665
Patented Oct. 6, 1970

3,532,665
SULFURIZED DECACYCLENE PIGMENT
Herman Gerson, New York, N.Y., and John F. Santimauro, Wyckoff, N.J., assignors to Allied Chemical Corporation, New York, N.Y., a corporation of New York
No Drawing. Filed Nov. 16, 1966, Ser. No. 594,686
Int. Cl. C08k *1/54;* C08f *45/14;* C08g *51/14*
U.S. Cl. 260—40          9 Claims

ABSTRACT OF THE DISCLOSURE

Sulfurized decacyclene is provided as a brown pigment characterized by good color and excellent lightfastness properties and having particles of colloidol size.

This invention relates to a new pigment. More particularly it relates to a novel brown pigment, sulfurized decacyclene and to processes for preparing it. This invention also concerns new synthetic resin compositions containing the novel pigment, sulfurized decacyclene and to the preparation of these resin compositions.

Sulfur colors comprise a large and well known group of organic coloring materials which are generally economical to produce, being obtained by the reaction of elemental sulfur, sulfides and other sulfur compounds with various organic compounds. While sulfur colors are widely used in the dyeing of textile fibers because of their excellent fastness and relatively low cost, no sulfur color has been found acceptable for use as a pigment. The sulfur colors produced heretofore have been unsuitable for use as pigments because the lakes and toners made from these dyes are weak, dull and exhibit poor lightfastness. Inasmuch as sulfur colors are particularly economical to produce, a sulfur color which functions satisfactorily as a pigment has obvious advantages.

It is a principal object of the present invention to provide sulfur colors in pigment form. Another object of this invention is to provide sulfurized decacyclene in pigment form. Still another object of this invention is to devise methods for conditioning sulfurized decacyclene to adapt it for pigmentary uses. A specific object of this invention is to provide novel synthetic resin film forming compositions pigmented with sulfurized decacyclene.

There and other objects and advantages ancillary thereto will be obvious from the following description.

We have made the surprising discovery that sulfurized decacyclene, when properly conditioned, becomes a highly desirable brown pigment. It has been found that sulfurized decacyclene in pigment form is characterized by having particles of colloidal size, thus, at least 40% of the particles have a size in the range of $10^{-4}$ to $10^{-7}$ cm. and at least 90% of the particles have a size less than 2 microns; preferably at least 70% of the particles have a size in the range of $10^{-4}$ to $10^{-7}$ cm. In this form, sulfurized decacyclene possesses excellent lightfastness (i.e. pigmented films show no color break after about 200 hours exposure in a Fad-Ometer), and does not bleed in the common organic solvents, e.g., toluene, xylene, butyl acetate, etc. Thus, sulfurized decacyclene when conditioned in accordance with our process is an economical brown pigment having excellent characteristics.

Sulfurized decacyclene is a sulfur color known as decacyclene orange and its preparation and uses as a dyestuff have been described in the art, for example, in U.S. Pat. 2,076,143 and in British Pat. 924,977. The dyestuff, decacyclene orange is obtained by heating a mixture of elemental sulfur and decacyclene at fusion temperatures and thereafter purifying the crude reaction product either by vatting with aqueous sodium sulfide, or refluxing with carbon disulfide. The product thus obtained has almost no color and is dull, and thus in this form, decacyclene orange is useless as a pigment.

We have discovered that decacyclene orange is converted into a desirable brown pigment possessing both excellent fastness to light and non-bleeding properties, by purifying crude decacyclene orange by treatment with carbon disulfide or sodium sulfide and subjecting said purified product to a conditioning treatment which comprises comminuting the decacyclene orange in the presence of an organic solvent.

According to one aspect of our invention a suspension of decacyclene orange in an organic solvent is conditioned by griding or milling; conventional milling apparatus, using for example, stainless steel grinding elements, buckshot, salt and/or sand fortified with a harder material such as nails, etc. can be employed for the conditioning treatment. The suspending liquid is conveniently an inexpensive easily removable organic liquid such as benzene, kerosene, toluene, acetone and the like. When decacyclene orange is milled in acetone, a pigment having exceptionally good lightfastness is obtained.

Finely divided sulfurize decacyclene which has been conditioned by milling in an organic solvent is an excellent pigment suitable for imparting brownish colorations to solid polymeric materials. Such polymeric materials include polyolefins such as polyethylene, polypropylene and polybutadiene; polyvinyls, such as polyvinyl chloride, polystyrene and acrylic polymers; cellulose and cellulose derivatives such as cellulose acetate; condensation polymers such as polyurethanes; polyesters, as for example, terephthalate esters, and formaldehyde condensation products for example, phenolic resins, alkyd resins and amino resins.

The instant pigment is especially suitable for coloring synthetic resin film-forming compositions. Such compositions are useful in the preparation of printing inks and various other coating compositions. Examples of film forming synthetic resins which may be used alone or as a mixture of synthetic resins, include: alkyds, both air dry-in and styrenated acrylic esters, both thermoplastic and thermosetting; vinyl resins; urethanes, both one-can and two-can type; and nitrocellulose, particularly in lacquer formulations.

These resins are well known in the coatings art and hence further discussion of their use, formulation and application need not be given here. Sulfurized decacyclene pigment is incorporated in such coating compositions in a manner conventional in the art and does not interfere with the polymerization or other drying mechanism by which the synthetic resin is converted to a durable film. Coating compositions pigmented with finely divided sulfurized decacyclene retain their usual characteristics and in addition have lightfast, non-bleeding colorations.

The following examples describe specific embodiments of our invention and illustrate the best method contemplated for carrying it out; but they are not to be interpreted as limiting the invention to all details thereof, since changes can be made without departing from the scope or spirit of the invention. Parts and percentages are by weight and temperatures are in degrees centigrade, in the examples unless otherwise noted.

PREPARATION OF SULFURIZED DECACYCLENE

Example 1

To 400 parts of sublimed sulfur, maintained at about 310°, 45 parts of decacyclene were added at the rate of 1 part per 3 minutes. The mixture was maintained at 305° to 315° for 10 hours and then cooled to ambient temperature. The shiny black crystalline reaction product was ground to a coarse powder.

The resultant crude reaction product (380 parts) was mixed with 760 parts of sodium sulfide and the mixture was diluted to 3800 parts by volume with water. The slurry was agitated and heated to boiling under refluxing conditions. The mass was maintained boiling for about 16 hours and then filtered. The red filtrate was aerated for about 24 hours at 60° to 65°. The precipitate which formed was separated by filtration and washed well with water. The washed product was dried at 80°. A yield of 80 parts of the sulfur dyestuff, decacyclene orange, was obtained.

CONVERSION OF DYESTUFF TO PIGMENT

Example 2

A mixture of 10 parts of the sulfur dyestuff prepared in Example 1 above, 600 parts of ⅛ inch stainless steel buckshot, 0.5 part of sodium chromate, and sufficient acetone to cover the mixture was ground in a mill for 48 hours. The finely ground sulfurized decacyclene was separated by screening from the buckshot and from the acetone by filtration. The filter cake was washed with acetone and then dried. The dark brown finely ground sulfurized decacyclene is suitable for use as a pigment for synthetic resin coating compositions which yield films which are fast to light and non-bleeding in organic solvents. Electron diffraction measurements of this pigment indicated that 72% of the particles had a size of 0.10 micron or less, and 96.7% of the particles had a size of 1.5 microns or less.

SYNTHETIC RESIN COATING COMPOSITIONS

Example 3

A mixture of 660 parts of xylene, 348 parts of a commercially available thermosetting acrylic resin slurry containing 48% non-volatiles, and 270 parts of finely ground sulfurized decacyclene was ground in a mill with about 1000 parts of ½ inch steel balls for about 48 to 60 hours. To this mass were added 340 parts of the same thermosetting acrylic resin slurry together with 15 parts of xylene. The mixture was ground for two hours. Thereafter, an additional 550 parts of the acrylic resin slurry were added and the mixture ground for one hour. After the addition of 300 parts of the acrylic resin slurry and 525 parts of a melamine solution containing 60% non-volatiles, the mixture was ground for one hour and then poured out of the mill through a screen to separate the steel ball grinding elements. The resultant brown pigmented paint contained: 9% sulfurized decacyclene pigment, 35% synthetic resin film former, and 56% solvent. When the coating composition was applied to clean metal surfaces, and then baked, a brown film was obtained which was of excellent lightfastness and did not bleed in solvents.

Example 4

The following was charged into a one gallon mill containing flint pebbles: 650 parts of acetone, 650 parts of water, 100 parts of cellulose acetate, and 100 parts of sulfurized decacyclene. This mixture was ground for 72 hours, then drowned with water and isolated by filtration. Finally it was dried and pulverized. About 195 parts of a bright brown powder was obtained.

Example 5

A mixture of 650 parts of acetone, 650 parts of water, 100 parts of polyethylene, and 100 parts of sulfurized decacyclene was charged into a one gallon mill containing flint pebbles and treated in the same manner as Example 5. The powder obtained had a bright brown color.

Example 6

Polypropylene in an amount of 100 parts was substituted for cellulose acetate in the mixture of Example 5 and the resultant dispersion was then milled and worked up in the same manner as Example 5. A bright brown powder was obtained.

Example 7

Methyl methacrylate in an amount of 100 parts was substituted for cellulose acetate in the mixture of Example 5 and the resultant dispersion was milled and worked up in the same manner as Example 5. The resulting powder had bright brown color.

Example 8

In a ballmill was charged 40 parts of alkydl melamine lacquer, 2 parts of titanium dioxide, and 0.2 part of sulfurized decacyclene. The mixture was ground for 20 hours. The resultant lacquer had a brown color.

Example 9

In a ballmill was charged 40 parts of alkyl melamine baking enamel, 4.0 parts of titanium dioxide, and 0.2 part sulfurized decacyclene. The mixture was ground for 30 hours whereupon an enamel having a brown shade was obtained which when baked on a metal surface was an attractive color of excellent lightfastness.

Example 10

In a ballmill was charged 40 parts of thermosetting acrylic enamel, 4.0 parts of titanium dioxide, and 0.2 part of sulfurized decacyclene. The mixture was milled for 30 hours whereupon a brown enamel was obtained which when baked on a metal surface had excellent lightfastness.

We claim:

1. A method of producing a brown pigment which comprises purifying crude sulfurized decacylene with carbon disulfide or sodium sulfide and conditioning the purified product by comminuting in the presence of an organic liquid to reduce the particle size of said sulfurized decacylene so that at least 40% of said particles have a size in the range of $10^{-4}$ to $10^{-7}$ cm. and at least 90% of the particles have a size less than 2 microns.

2. A process as defined in claim 1 wherein said conditioning comprises grinding a suspension of said sulfurized decacylene in acetone.

3. A method as defined in claim 1 wherein said sulfurized decacyclene is prepared prior to said conditioning treatment by heating a mixture of elemental sulfur and decacylene at the fusion temperature.

4. A brown pigment which consists of sulfurized decacyclene obtained by the method of claim 1.

5. A brown pigment as defined in claim 4 wherein at least 70% of the particles of said sulfurized decacyclene have a size in the range of $10^{-4}$ to $10^{-7}$ cm.

6. A brown pigment as defined in claim 4 wherein said organic liquid is acetone.

7. A method of producing a brown pigment which comprises the steps of (a) heating a mixture of elemental sulfur and decacyclene at the fusion temperature, (b) grinding the resultant crude sulfurized decacyclene product and forming a slurry of said product in sodium sulfide or carbon disulfide to remove impurities therefrom, (c) separating said purified product from said sodium sulfide or carbon disulfide and (d) conditioning said purified product by comminuting in the pressure of an organic liquid to reduce the particle size of said sulfurized decacyclene so that at least 40% of said particles have a size in the range of $10^{-4}$ to $10^{-7}$ cm. and at least 90% of the particles have a size less than 2 microns.

8. A solid polymeric film-forming material in which there is incorporated sulfurized decacyclene as defined in claim 4.

9. A polymeric material as defined in claim 8 wherein said polymeric material is a film-forming synthetic resin.

References Cited

UNITED STATES PATENTS

| | | | |
|---|---|---|---|
| 2,076,143 | 4/1937 | Hagge et al. | 260—139 |
| 3,104,233 | 9/1963 | Altermatt | 260—37 |
| 3,190,850 | 6/1965 | Burke | 260—38 |

FOREIGN PATENTS

| | | |
|---|---|---|
| 765,636 | 1/1957 | Great Britain. |

OTHER REFERENCES

Modern Plastics Encyclopedia 1965, vol. 4, No. 1A, September 1964, pp. 420–421.

Lubs, H. A., The Chemistry of Synthetic Dyes and Pigments, Reinhold Pub. Co., New York, 1955, pp. 309 and 625.

Patton, Temple C., Paint Flow and Pigment Dispersion, Interscience Publishers, New York, 1964, p. 245.

ALLAN LIEBERMAN, Primary Examiner

J. H. DERRINGTON, Assistant Examiner

U.S. Cl. X.R.

106—193, 204, 288; 260—37, 38, 39, 41, 41.5, 139

UNITED STATES PATENT OFFICE
CERTIFICATE OF CORRECTION

Patent No. 3,532,665            Dated October 6, 1970

Inventor(s) Herman Gerson and John F. Santimauro

It is certified that error appears in the above-identified patent and that said Letters Patent are hereby corrected as shown below:

Column 2, line 24, "griding" should be --grinding--.

Column 4, line 43, "alkyl" should be --alkyd--.

line 59, "decacylene" should be --decacyclene--.

line 63, "decacylene" should be --decacyclene--.

Column 5, line 14, "pressure" should be --presence--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents